(12) United States Patent
Kocdemir et al.

(10) Patent No.: US 11,593,985 B2
(45) Date of Patent: Feb. 28, 2023

(54) IMAGE RENDERING METHOD AND APPARATUS

(71) Applicant: Sony Interactive Entertainment Inc., Tokyo (JP)

(72) Inventors: Sahin Serdar Kocdemir, London (GB); Rosario Leonardi, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/453,206

(22) Filed: Nov. 2, 2021

(65) Prior Publication Data

US 2022/0148250 A1 May 12, 2022

(30) Foreign Application Priority Data

Nov. 11, 2020 (GB) ..................................... 2017815

(51) Int. Cl.
*G06T 15/04* (2011.01)
*G06T 15/20* (2011.01)
*G06T 15/60* (2006.01)
*G06T 15/00* (2011.01)
*G06T 11/40* (2006.01)

(52) U.S. Cl.
CPC .............. *G06T 15/04* (2013.01); *G06T 11/40* (2013.01); *G06T 15/005* (2013.01); *G06T 15/20* (2013.01); *G06T 15/60* (2013.01); *G06T 2215/12* (2013.01)

(58) Field of Classification Search
CPC ....... G06T 15/005; G06T 15/04; G06T 15/20; G06T 15/60; G06T 11/40; G06T 2215/12
See application file for complete search history.

(56) References Cited

U.S. PATENT DOCUMENTS

| 2015/0287166 A1 | 10/2015 | Cerny |
| 2016/0093098 A1 | 3/2016 | Andersson |
| 2018/0268604 A1* | 9/2018 | Story .................... G06T 3/4007 |
| 2018/0276790 A1 | 9/2018 | Mantor |
| 2018/0286105 A1 | 10/2018 | Surti |
| 2018/0357780 A1 | 12/2018 | Young |

(Continued)

FOREIGN PATENT DOCUMENTS

| WO | 2018227100 A1 | 12/2018 | |
| WO | WO 2019/234397 A1 * | 12/2019 | ............. G06T 11/40 |

OTHER PUBLICATIONS

Johnson, Gregory S., et al. "Soft irregular shadow mapping: fast, high-quality, and robust soft shadows." Proceedings of the 2009 symposium on Interactive 3D graphics and games. 2009. (Year: 2009).*

(Continued)

*Primary Examiner* — Daniel F Hajnik
(74) *Attorney, Agent, or Firm* — Matthew B. Dernier, Esq.

(57) ABSTRACT

A shadow rendering method for an image includes: re-projecting 3D coordinates of image pixels from an image space of the image to points on a 2D shadowmap space; estimating at least one of a horizontal and vertical distribution of the points in the shadow map space; for a flexible scale rasteriser 'FSR', updating a horizontal or vertical FSR curve corresponding to a distribution of FSR bins for the shadow map so that the corresponding horizontal or vertical distribution of points per bin is most even; and rendering the shadow map using flexible scale rasterization.

15 Claims, 12 Drawing Sheets

(56) References Cited

U.S. PATENT DOCUMENTS

2019/0102865 A1 4/2019 Hensley
2020/0380744 A1* 12/2020 Valient .................... G06T 11/40

OTHER PUBLICATIONS

Schwärzler, Michael. "Real-time soft shadows with adaptive light source sampling." Applied Optics 24.18 (2009): 19-26. (Year: 2009).*
Combine Search and Examination Report for corresponding GB Application No. GB2017815.8, 5 pages, dated May 10, 2021.
Extended European Search Report for corresponding EP Application No. 21204937.3, 9 pages, dated May 6, 2022.

* cited by examiner

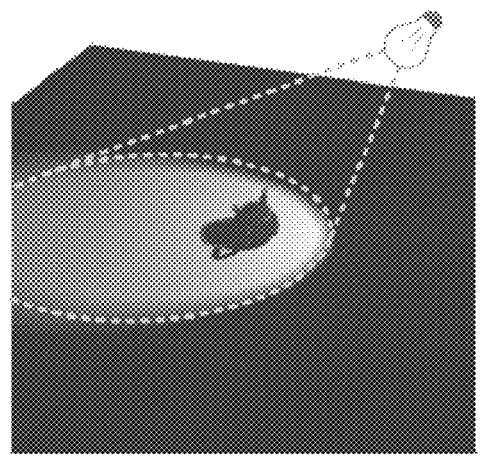
FIG. 6A  FIG. 6B
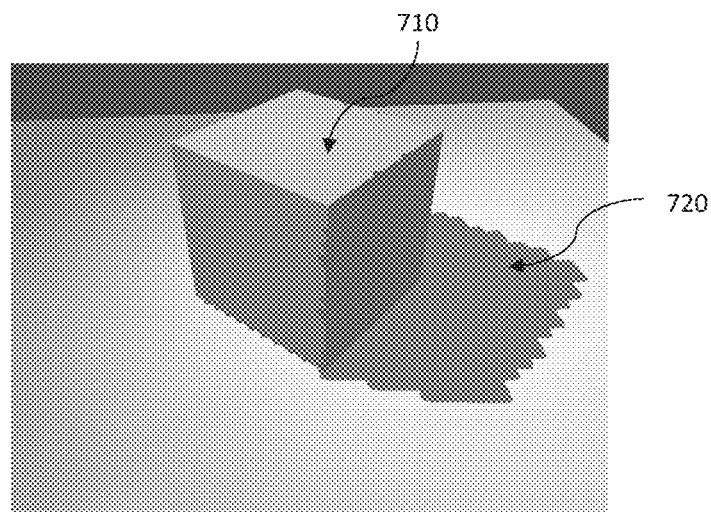
FIG. 7

IMAGE RENDERING METHOD AND APPARATUS

BACKGROUND OF THE INVENTION

Field of the Invention

The present invention relates to an image rendering method and apparatus.

Description of the Prior Art

Conventional videogame consoles and other computing devices that display 3D graphics internally represent 3-D objects as a mesh of polygons, and typically triangles.

To render the object on a screen that is comprised of pixels, the mesh representation must be converted into a corresponding set of pixels.

This is typically done by defining a position, orientation, and field-of-view of a virtual camera (i.e. defining what part of the mesh will be visible the image), and then identifying which triangles of the mesh correspond to which pixels in the image, in a process called rasterisation; any texture associated with a respective triangle can then be applied to the identified pixels in the image.

The process of rasterisation assumes that all triangles and all pixels are of equal value within the final image, but typically this is not the case; the user's gaze may not encompass all of the image, their attention may be focused on a particular point of interest within the image, and/or the image may encompass a sufficient field-of-view of the user that parts of the image are projected onto the area of the retina outside the fovea, and so are not perceived with similar clarity to the foveated region.

Recognising this, it is possible to perform rasterization on a per-pixel level for the part of the image expected to be in the fovea region, whilst performing rasterization on only a subset of pixels in the part of the image outside the fovea region, effectively reducing the resolution and associated computational cost for those outer regions. Such an approach is known as foveated rendering.

However, there is still scope to improve such a technique further.

The present invention seeks to address or mitigate this need.

SUMMARY OF THE INVENTION

In a first aspect, shadow rendering method for an image is provided in accordance with claim 1.

In another aspect, shadow rendering apparatus is provided in accordance with claim 13.

In another aspect, a system is provided in accordance with claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2A-2D are schematic diagrams of flexible scale rasterization and pixel rasterisation spaces in accordance with embodiments of the present description.

FIGS. 6A and 6B are schematic diagrams of a lit object and corresponding shadow map in accordance with embodiments of the present description.

FIG. 7 is a schematic diagram of an object rendered with a low resolution shadow.

DESCRIPTION OF THE EMBODIMENTS

Figure 1:
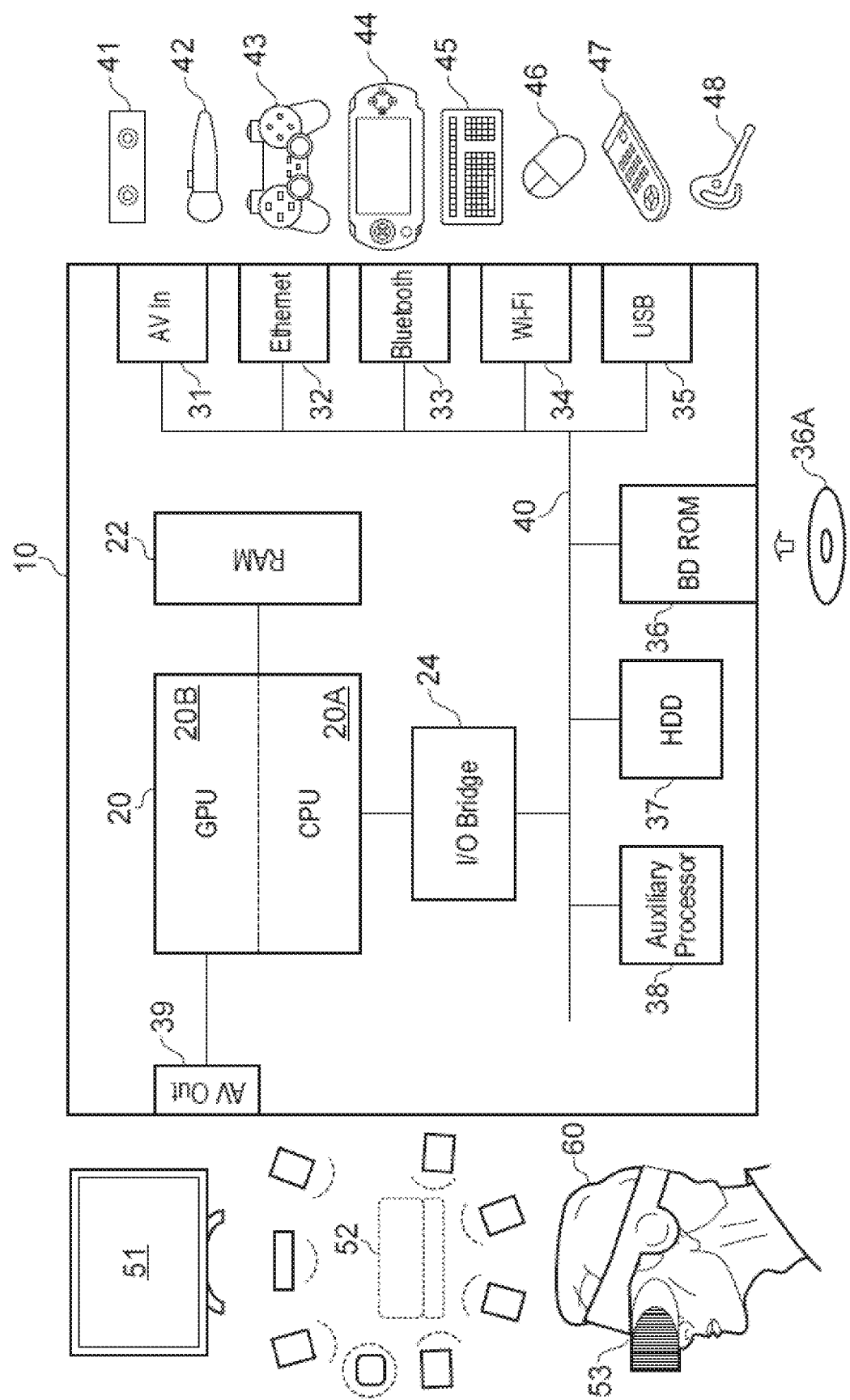
FIG. 1 is a schematic diagram of an entertainment device in accordance with embodiments of the present description.

Referring now to the drawings, wherein like reference numerals designate identical or corresponding parts throughout the several views, an image rendering method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figures 2A, 2B:
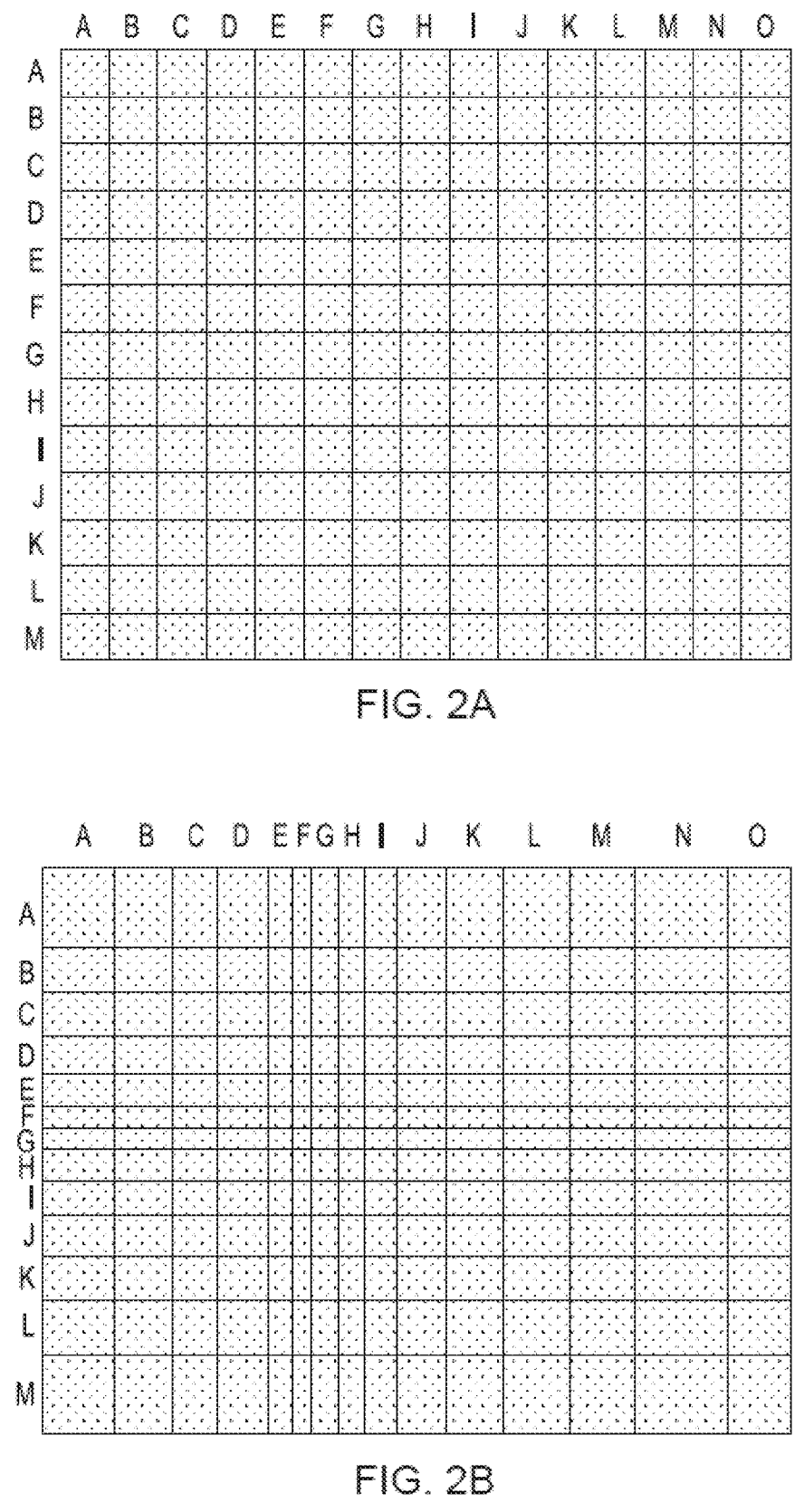

Referring now to FIGS. 2A and 2B, in an example embodiment of the present description, images are rendered using so-called flexible scale rasterization (FSR).

In this approach, instead of identifying which triangles of a mesh correspond to which pixels in an image, FSR identifies which triangles of a mesh correspond to an array of 'bins', which have a non-uniform spatial distribution. The distribution is typically defined by two curves respectively specifying horizontal and vertical mappings between a uniform distribution and the FSR distribution.

FIG. 2A shows a uniform distribution of pixels in a so-called raster space. In conventional rasterisation, each pixel can be thought of as an equal-sized bin that part of a given triangle either does or does not occupy.

By contrast, FIG. 2B shows a non-uniform distribution of bins in a so-called 'window space' used during FSR. In this case, for ease of understanding there are the same number of bins in FIG. 2B as there are in 2A, although it is not necessary for the number of bins in window space to equal the number of pixels in raster space, as will be explained later herein.

Figure 3:
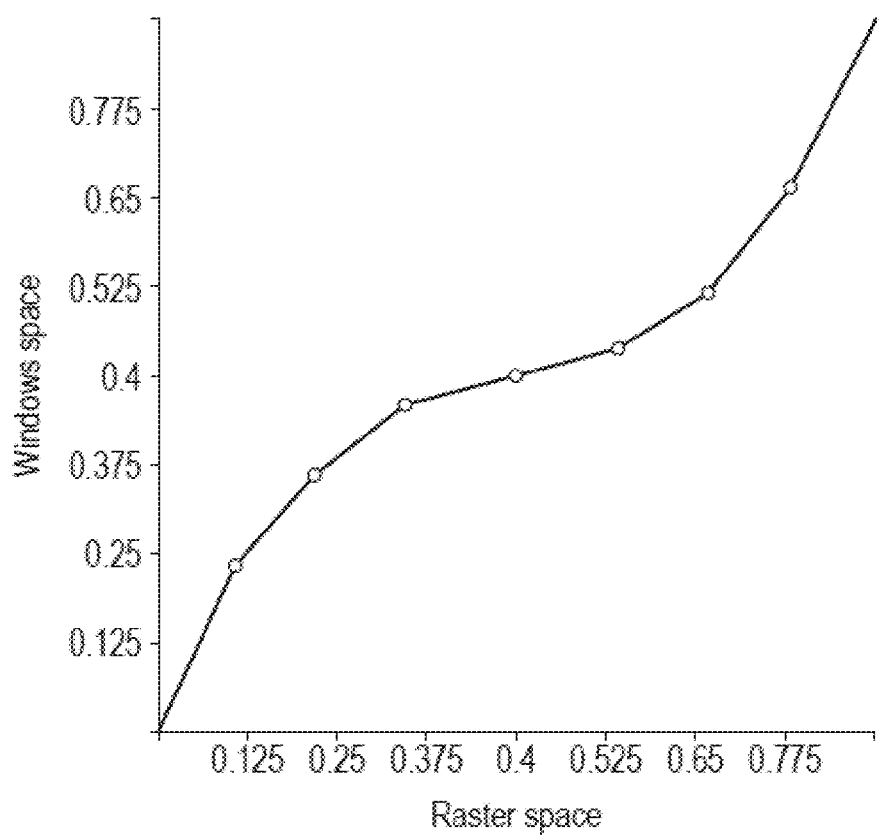
FIG. 3 is a schematic diagram of a curve defining a bin distribution in one direction for flexible scale rasterisation in accordance with embodiments of the present description.

As noted above, the mapping between raster space and window space is typically specified by a respective curve for each of the horizontal and vertical directions, with an example curve shown in FIG. 3 (the increments on each axis are 0.125 in the range 0 to 1). It will be appreciated that a diagonal line would be a 1:1 mapping (i.e. no change).

Figure 2C:
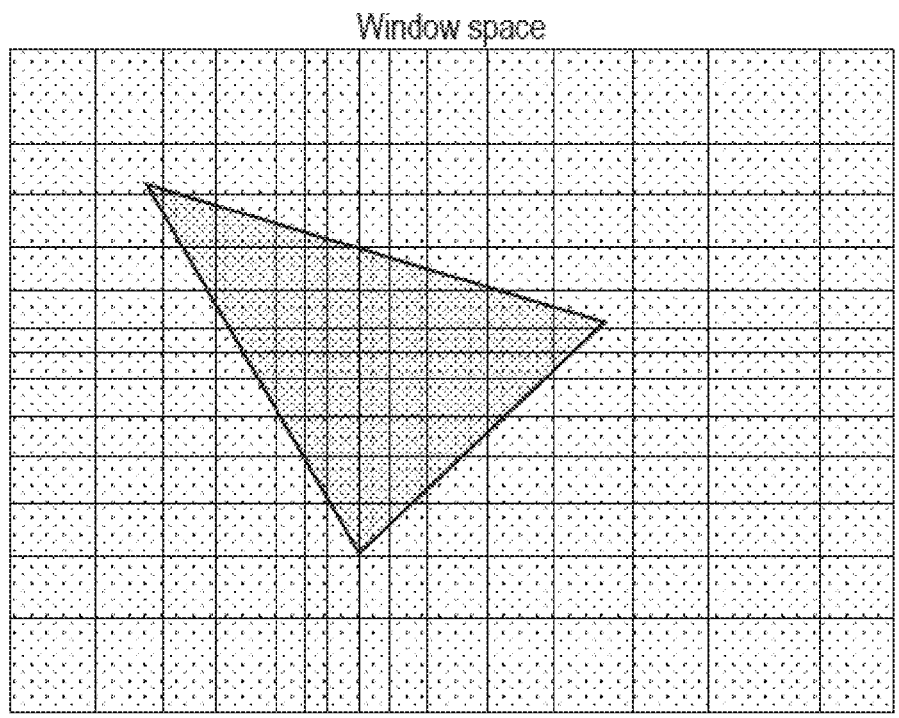

FIG. 2C shows a triangle (e.g. from the mesh of an object to be rendered) projected on to the non-uniform distribution of bins in the window space.

Figure 2D:
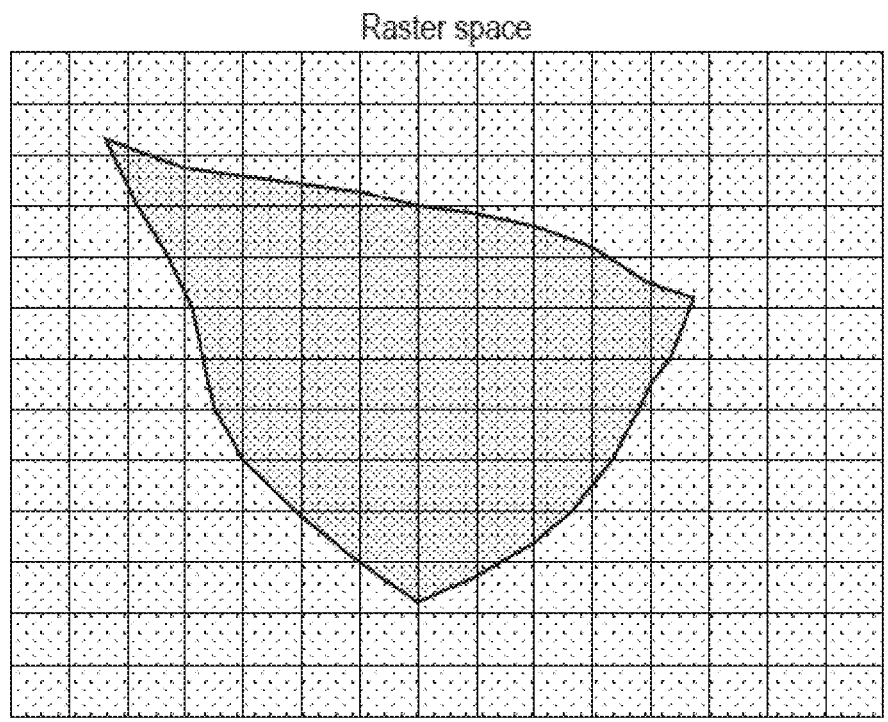

Finally, FIG. 2D illustrates how the triangle would appear in raster space (pixels of an image) if a 1:1 mapping of the FSR bins in FIG. 2C to pixels in FIG. 2D is performed. It can be seen that the higher density of bins within the centre of the triangle in the example window space results in a distortion of the triangle in raster space, expanding its central area.

One potential advantage of FSR over standard pixel-based rasterization is that the nonlinear distribution of bins in the window space can be made to approximate the nonlinear distribution of visual acuity in a user's eye, so that a region of the image corresponding to the user's fovea (high resolution portion of the retina) has a high density of small bins, whilst a region of the image corresponding to the user's peripheral vision has a low density of large bins.

Accordingly, if the small bins in the window space are chosen to roughly correspond with individual pixels in the raster space, then an alternative mapping from window space to raster space that generates a 1:1 mapping between bins and pixels for the smallest bins, and a 1:many mapping between bins and pixels for larger bins, will generate an image with an effective variable resolution having a highest, typically maximum, resolution where the bins were smallest (typically corresponding to a presumed or tracked fovea position), and a lowest resolution where the bins were largest (typically corresponding to a presumed or tracked peripheral vision area).

Figure 4:
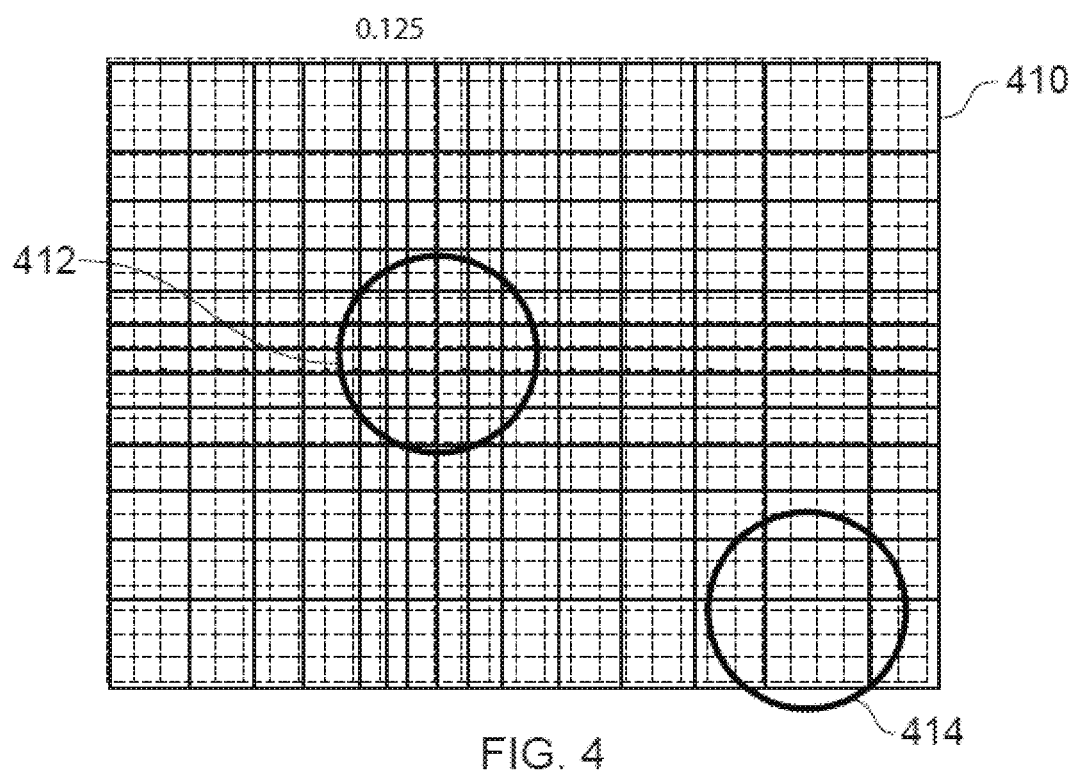
FIG. 4 is a schematic diagram of a mapping from a flexible scale rasterisation space to a pixel rasterisation space in accordance with embodiments of the present description.

This is illustrated schematically in FIG. 4, in which a pixel array 410 (represented by dashed lines) is overlaid on a window space (e.g. like that of FIG. 2B) such that there is a 1:1 mapping between bins and pixels in a fovea region 412 (or equivalent region at which a high resolution is desired) and a 1:many mapping between bins and pixels in a peripheral region 414 (or equivalent region at which a high resolution is not desired).

It will be appreciated that an appropriate mapping between bins and pixels can be based upon the curves used to define the distribution of bins in window space. Similarly it will be appreciated that optionally there may be a smoothing or blending of values given to pixels at or near bin boundaries, optionally with the degree and/or range of blending/smoothing (i.e. the number of pixels being adjusted, and by how much) being a function of the number of pixels mapping to a given bin.

In this way, foveated rendering (or more generally variable effective resolution rendering to uniform resolution pixels) can be efficiently achieved by rendering mesh components to bins whose distribution is defined by horizontal and vertical curves (or any suitable means of defining a 2D distribution), and then mapping the bins to pixels in the raster image based on an inverse of the bin distribution, typically but not necessarily set to provide a 1:1 size mapping between the smallest bins and pixels, or optionally where the number of the smallest bins is below a threshold, between bins and pixels for the smallest bins having a population in window space above a threshold number. The mapping process can use any suitable sampling technique, for example based on bin size, to derive a given pixel value from the corresponding bin (or bins, in the case of spanning a bin boundary, or the use of smoothing/blending).

Hence in summary FSR is a feature (software or hardware) which allows the resolution of the rendering to be adjusted across render buffers dynamically so that areas requiring more resolution can be rendered in more detail. As noted above, an example application of this is foveated rendering, which concentrates high resolution rendering to the area of the image corresponding to the fovea (e.g. the centre) of the viewer's eyeline, matching the human optical system which has a higher density of photoreceptors in the foveal region. Gaze tracked foveated rendering systems utilise this further by moving the high resolution area to track the part of the image that the eye is looking at. In the above scheme, the fovea position from the gaze tracker could then be used to adjust the x and y mapping curves and hence move the distribution of higher resolution bins to follow the fovea position on the image.

Figure 5B:
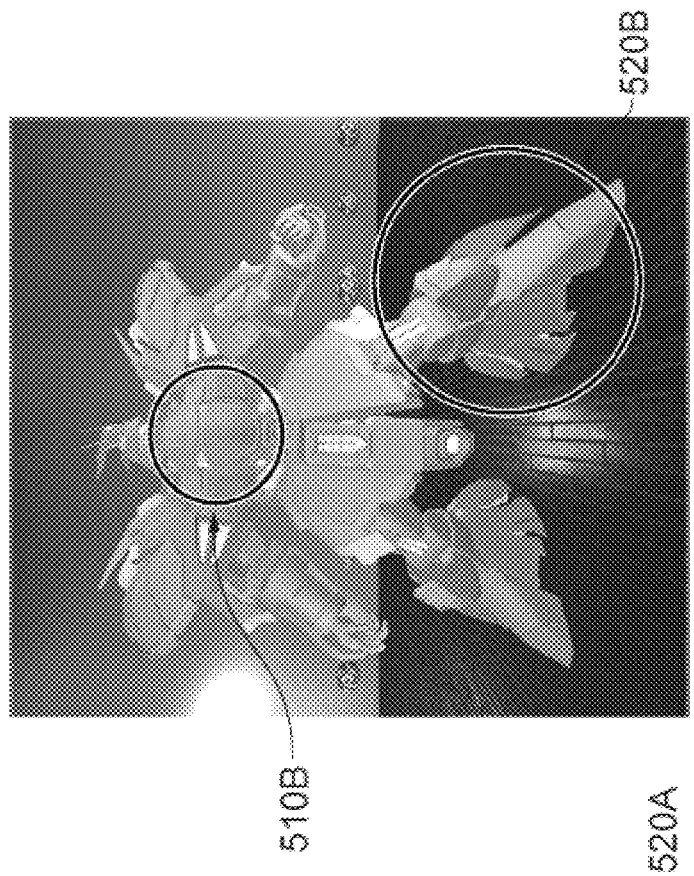
FIGS. 5A and 5B are schematic diagrams of an image in a flexible scale rasterisation space and a corresponding mapped image in a pixel rasterisation space in accordance with embodiments of the present description.
Figure 5A:
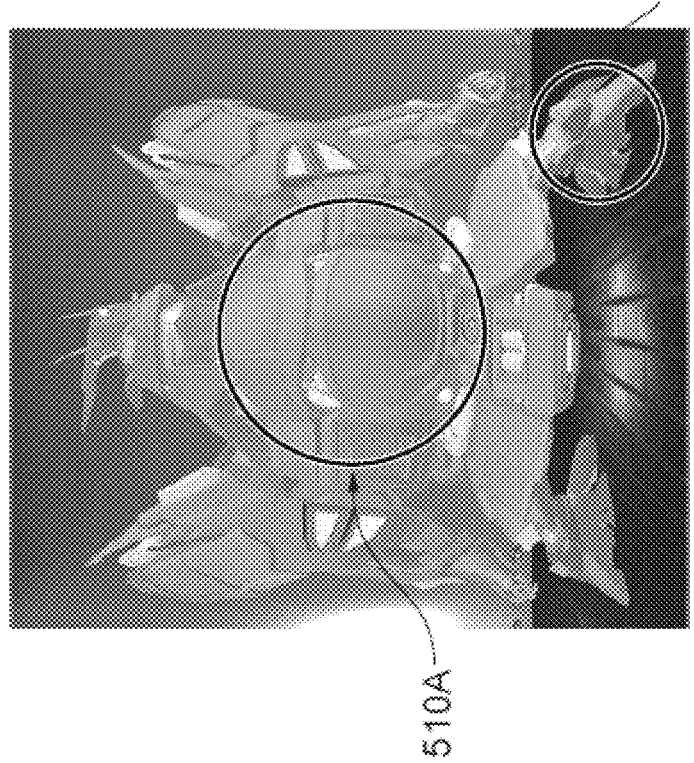

An example is illustrated in FIGS. 5A and 5B. Like FIG. 2D, FIG. 5A shows the effective distortion in the image of the character caused by the increased density of bins coincident with the character's upper torso, and the relative paucity of bins in the corners and more generally the peripheral of the image.

FIG. 5B then shows the mapping from the window space to the raster space based on the inverse of the curves (or whatever suitable scheme was used to define the bin distribution if not curves).

Now, the region of the image showing the character's upper torso has a large degree of detail (i.e. a high effective resolution), as the large region 510A generated in window space now occupies a small region 510B of raster space (for example due to a 1:1 mapping between bins and pixels), whilst a peripheral region showing the character's foot as a low degree of detail (i.e. a low effective resolution), as the small region 520A generated in window space now occupies a large region 520B of raster space (for example due to a 1:many mapping between bins and pixels).

As noted previously herein, the above technique can provide an efficient means by which to generate a foveated render of an image. However, there is scope for improvement.

As noted above, foveated rendering can prioritize some regions of a camera viewport in the rasterization process. This technology can be supported by hardware and mainly targets improving the performance of high-resolution rendering by changing the effective resolution for different screen regions. It is found to be useful particularly for augmented or virtual reality applications where the detail is given based on user focus/gaze and scene detail.

Embodiments of the present description exploit this technology to provide more detailed shadows in some areas of an image, by calculating the contribution of a shadow map texture across the scene.

Referring to FIGS. 6A and 6B, Shadowmapping is a rendering technique where a virtual camera is placed at the position of a virtual light, and used to compute distances from the light into a so-called 'shadowmap' texture. Typically every texel in this texture then holds distance information from the light to objects in the virtual world. This is illustrated in FIG. 6A showing the light and the lit object, with the resulting depth map from the light's position shown in grey scale (darker=nearer) in FIG. 6B. If the distance to the light is less than the depth value stored in the depth map, the point is illuminated; otherwise it's in shadow.

Hence in order to efficiently calculate if a point in the virtual world is in shadow or not, that point is transformed into shadowmap texture space and the value is compared against the actual distance to the light. So, if distance from the shading position to the light position is greater than the value saved into the shadowmap, there must be some object between the shading position and the light. Hence that point in the virtual world can be assumed to be in shadow.

However an issue occurs if the resolution of the shadow map is lower than the resolution of the on-screen image. This can occur when trying to keep framerates high, as the processing cost of rendering a high resolution shadowmap will deny resources to other aspects of the rendering pipeline that can impact performance when the graphics processor is at or approaching its resource capacity—as is often the case when seeking to maximise framerates.

The situation is illustrated in FIG. 7. Here the shadow 720 produced from the shadow map is at a noticeably lower resolution than that of the cube 710 in the image, resulting in apparent shadow artefacts as the shadow 720 does not appear to properly correspond with the object 710 that is notionally casting the shadow.

Figures 8A, 8B:
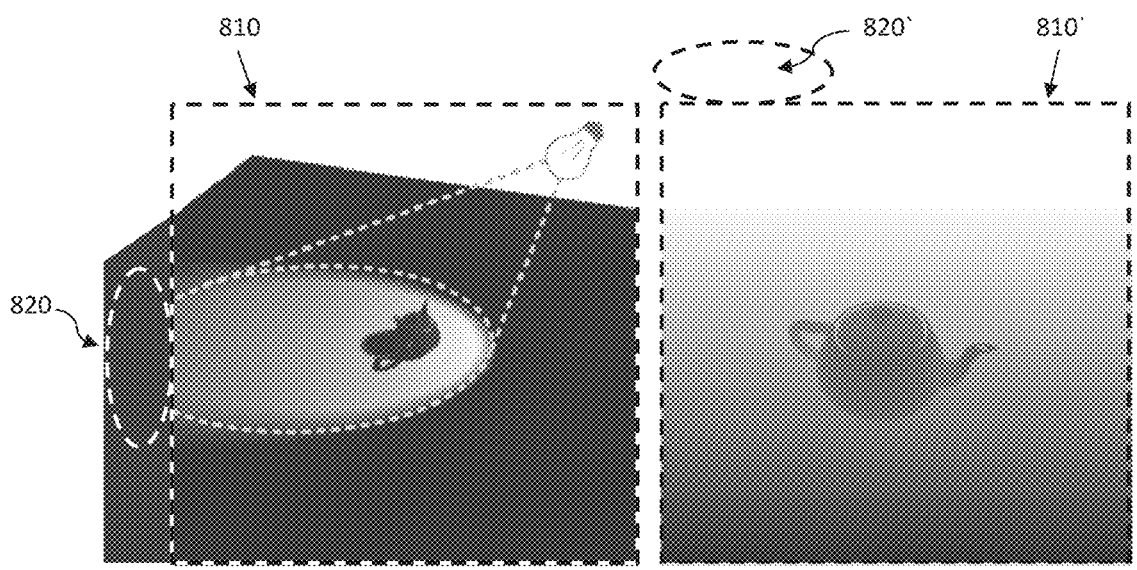
FIGS. 8A and 8B are schematic diagrams of a lit object and corresponding shadow map in accordance with embodiments of the present description.

A further issue relates to the varying contributions of texels in a shadowmap texture when projected onto the virtual world's space (i.e. the space occupied by the objects, such as cube 710, to form shadow 720). Some shadowmap texels will be used in more/larger image regions than others (e.g. ones closer to the viewer/virtual camera positon), and indeed some may be unused. FIGS. 8A and 8B illustrate this. The current image space is represented by a dotted rectangle (810, 810'). A region 820 of the shadowmap outside this image space therefore does not contribute (820') to the current image.

Similarly, lighting effects (e.g. masking textures) can also affect texel contributions. In FIG. 8, the light is not uniform over the shadowmap; instead there is a circular masking texture applied (indicated by the dotted lines projecting a circle around the pool of light). Consequently areas of the shadow map corresponding to fully opaque parts of the masking texture outside this circle will always be in shadow and never contribute.

This variance in contribution during shading computation for shadowmap texels creates inefficiencies in rendering, which it would be beneficial to avoid or reduce. A known approach is to use multiple shadowmaps for different areas of the image, such as for example a different shadowmap for more distant geometry.

In light of the above issues, embodiments of the present description seek to improve shadowing quality more efficiently by making use of flexible scale rasterization technology (also known as flexible screen resolution technology) as described previously herein, which is supported in hardware by the Sony PlayStation 5®. FSR can be used to adjust the quality of shadow map rendering based on the shadowing contribution of different regions in the final image.

In this approach, FSR is used to change shadow map rasterisation using FSR x and y (horizontal and vertical) curves discussed previously herein with reference to FIG. 3.

It will be appreciated that shadowmap rendering is a separate process to main scene/image rendering, and so can use different x and y FSR parameters to adjust the curves, for example based on improved image space projection of shadowmap texels.

The shapes adopted by the horizontal and vertical resolution curves determine the areas to be rendered in detail for shadow maps. Generation of these curves can be achieved by re-projecting the image pixels into shadow mapping space and counting the number of re-projected pixels in different sections in the shadow map space, as described later herein.

In more detail, the aim is to find a good distribution of texels within the shadowmap space that will provide an improved quality of shadows in image space. This can be done by giving a higher priority to certain areas in the shadow map and putting more texels in those areas. The x and y curves effectively define the priority.

Figure 9A:
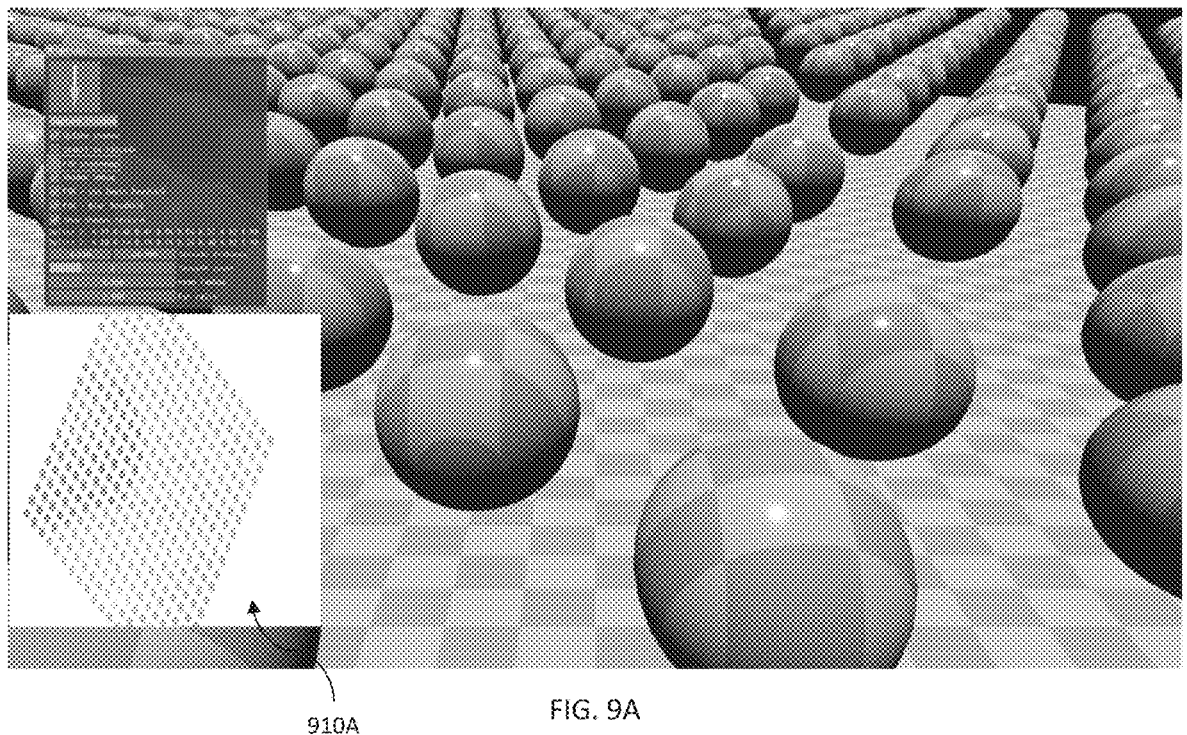
FIG. 9A is a schematic diagram of an image rendered using a conventional shadow map.

Referring to FIG. 9A, this illustrates a conventional shadowmap 910A, where all the balls from the main image all have the same size in the shadowmap texture. This leads to having fewer shadowmap texels available for near-the-camera regions in image space; that is to say, a similar number of texels are allocated to nearby ball shadows as are allocated to distant ball shadows. The respective texels are illustrated by the chequerboard pattern in the image, and it can be seen that the texels in the foreground floor and balls appear large, indicative of low resolution/quality.

Figure 9B:
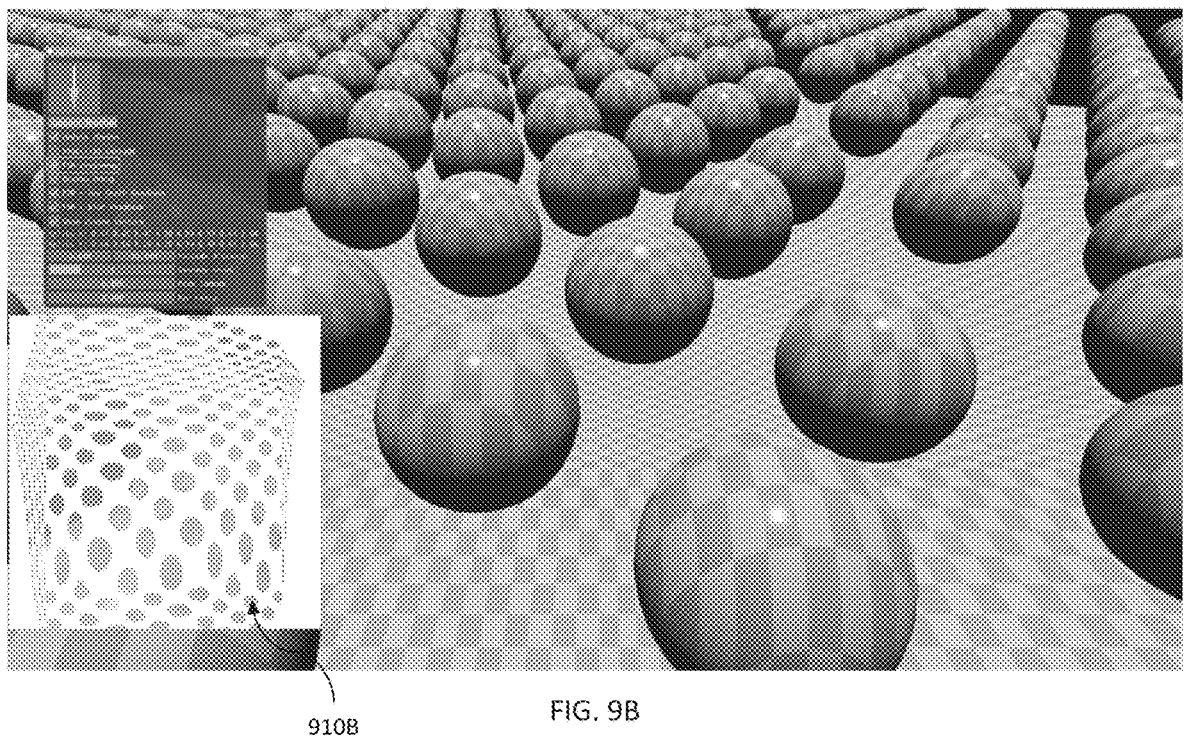
FIG. 9B is a schematic diagram of an image rendered using a shadow map in accordance with embodiments of the present description.

Referring next to FIG. 9B, FSR has been used to distort the shadow rendering based on image visibility (e.g. whether near or far, or another factor that may affect apparent visibility of an element of the image, including for example its proximity to a point of focus/gaze of the user). Hence shadowmap 910B is has been distorted, with the x and y curves in this case giving less importance to the edges of the shadowmap and allocating far more texels to the shadows near the camera's position.

The result can be seen in the image, where the resulting checkerboard pattern is finer (of higher resolution/quality) for the balls in the close and centre view.

In this way, by distorting the shadow rendering based on pixel visibility, more detailed shadows are generated where the scene will benefit more from detailed shadows, whilst using the same overall resource as a conventional shadowing scheme. Hence the apparent quality can be improved, or the apparent quality can be maintained whilst using fewer resources, or a combination of the two according to a preferred trade-off.

The process can thus be summarised as follows (the numbers do not necessarily imply a particular sequence):

i. No-shadow receiving pixels are treated as invalid and optionally summed up in a separate counter:

During rendering the main image, not all materials will sample from the shadowmap texture, such as pixels for sky or some emissive materials (e.g. light sources). These are termed 'no-shadow receiving' pixels and can be counted separately in order to normalize the subsequent computations for 'shadow-receiving' pixels. Hence for example if all pixels in the image are sky and hence no-shadow receiving pixels, then there is no need to adjust the shadowmap rendering for that image.

ii. Image space coordinates are re-projected into shadow mapping space:

Each image pixel has a depth value associated with it (and so has x, y, and z coordinates within the virtual world/image coordinate system). Consequently its position within shadowmap space can be determined by multiplying its image space position with the shadowmap's projection matrix, which is typically a 4×4 matrix which is used to transform values from a first space (e.g. a world space or image space) into a second space (e.g. a shadow map space or camera's clip space).

Further, shadowmap camera parameters, near and far planes, and viewport can be adjusted based on the light source type and its attenuation characteristics. Thus if the light source is treated as a directional one, like the sun in most cases, an orthographic projection can be used where the sizes of the objects are not affected by their distance to the light source. However, the techniques herein do not depend on these projection matrix characteristics.

For all the pixels re-projected, this results in a set of 2D points in shadowmap space that can be subsequently used to calculate the FSR x and y curves that will improve the apparent quality for the image scene. Optionally the pixels that are re-projected are limited to valid pixels, which may be thought of as those pixels other than no-shadow receiving pixels (e.g. typically shadow receiving or potentially shadow receiving pixels).

iii. Optionally the shadow map area is restricted by the bounding volume of the re-projection results:

To reduce non-contributing space in the shadowmap texture as previously shown in FIG. 8A, shadowmap camera properties such as its viewport and near/far clip distances can be adjusted. When pre-computing which points in the texture to use with the technique, a shadowmap space bounding volume can thus be used to choose a good camera viewport that preferably captures regions within the bounding volume whilst reducing or minimising regions outside it.

iv. Points are counted across horizontal and vertical coordinates:

Typically the results from step ii. can be used for this purpose, preferably limited to valid pixels. The resulting set of 2D points in shadowmap space can be counted to determine their distribution across horizontal and vertical regions. Hence if many points are re-projected into the same region of shadowmap space, proportionately more texels should be assigned to that region.

v. The number of points to have in each bin or section is calculated based on the number of valid pixels and the number of sections required for the FSR curves:

The bins are as per the FSR bins discussed previously herein, and can be used as the regions of step iv above for counting purposes. Each bin can be equated with the same predetermined number of texels, e.g 1 per bin, or optionally 2, 4, 6, 8 or any number supported by the shadowmap rendering system. Typically however one texel per bin is used.

Hence for example for only a 1-dimensional FSR curve (e.g. considering only the x or y direction for the purposes of explanation) and 100 valid points that are reprojected into a shadowmap space with 5 FSR bins, then preferably 20 points should be located in each bin to create a good distribution of resolution. Consequently the curve can be adjusted until this distribution (or as near as possible) is achieved.

vi. Horizontal and vertical FSR curves are calculated to have as close to the same number of valid points in each section as possible:

Continuing with the 1-dimensional FSR curve example in step v., in this step the FSR curve is adjusted to have preferably 20 valid points (for example) in each bin to give a better distribution of shadowmap texels over the image as there will be more valid points for near areas.

In practice, for ultra-high resolution images, this can potentially result in too many valid points, for example around 8 million. However due to the linearity of the region separation algorithm (i.e O(n)), it is possible to first merge valid points into low number of buckets (e.g. 256) and define the curve and hence the size of the 5 bins based on the number of elements in each bucket, to result in a similar overall number in each bin. Similarly, subsamples of the image may be used, such as every Nth pixel in the x and y directions, where N=2, 3, . . . , 10, or any other suitable figure that still provides an adequate approximation of the distribution of points and hence a means of updating the curves.

Figure 10:
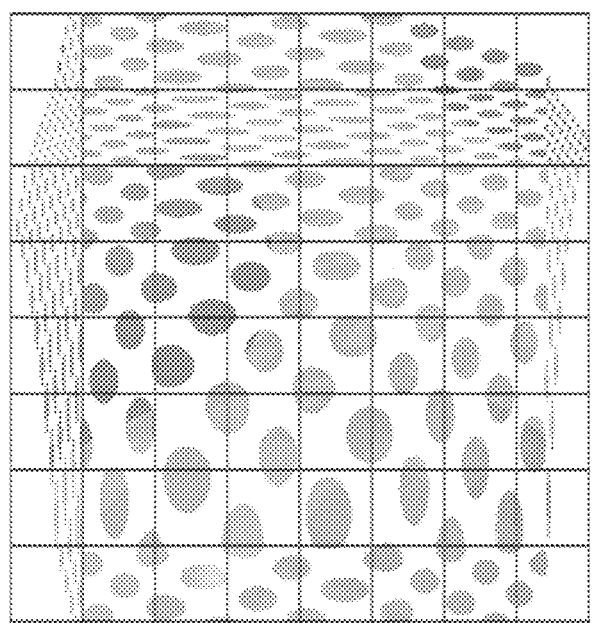
FIG. 10 is a schematic diagram of a shadow map in accordance with embodiments of the present description.

It will be appreciated that 5 bins and 100 points are purely exemplary and non-limiting, and any suitable number of bins may be selected for the x and y axes (typically with a different number in each axis), and any number of points depending upon the image resolution and current viewport of the virtual camera for the image. FIG. 10 illustrates another example distribution, for the shadowmap 910B of FIG. 9.

Regarding the region separation algorithm referred to above, it will be appreciated that during the reprojection step, a plurality of shadowmap space x,y values are created where the on-screen pixels will get samples from. This is illustrated for Example in FIG. 11A, which shows reprojected screen samples in shadowmap space.

Figure 11A:
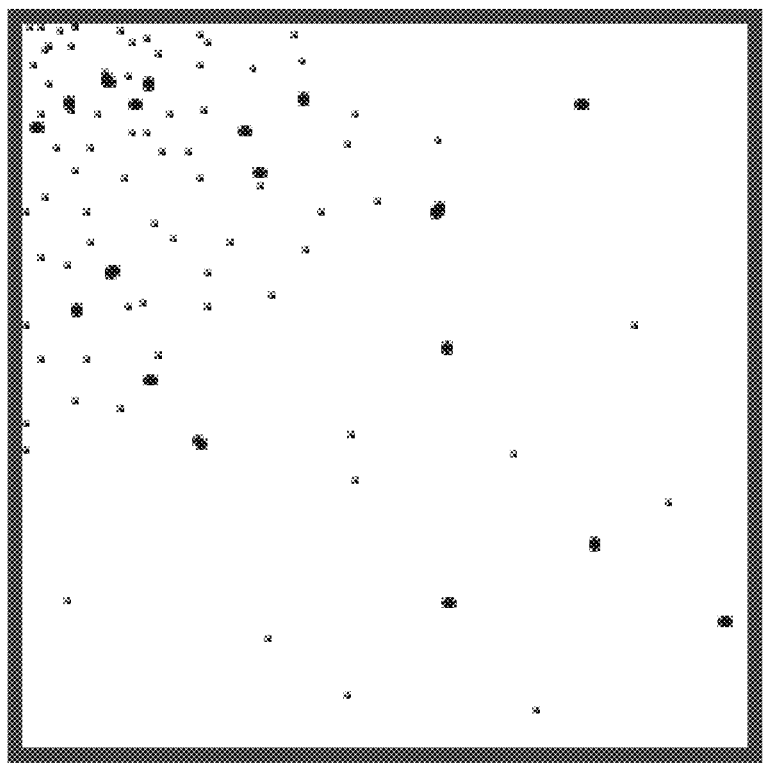
FIGS. 11A-C illustrate the partitioning and remapping of a shadow map texture space in accordance with embodiments of the present description.

In the example shown in FIG. 11A, each point is a re-projection coordinate originating from the image. This results in is a concentration in the top left region and so the x and y FSR curves should be adjusted to provide better resolution/quality in that part.

Since there may be too many pixels to count individually (for example within a given available time or processing budget on a per-image frame basis), the pixels can be segregated into vertical and horizontal bins. So for a non-limiting example of 128 valid pixels, a non-limiting example of 10 bins in each axis could be used. The result may be as follows:

Horizontal bin counts (left to right on image, number of points in equally split regions)=[47, 32, 20, 14, 8, 4, 2, 1]

Vertical bin counts (top to bottom)=[40, 30, 20, 20, 10, 5, 2, 1]

Optionally, in order to avoid sudden changes in bin counts between image frames, these counts can be smoothed (e.g. filtered or averaged) in a temporal fashion between frames so that the FSR parameters change more smoothly.

Based on these initial bin counts (whether smoothed or not), the algorithm may then sum the number of points to determine what would be a preferable number for a numerically equal split (as detailed in step 5 above), and progress along the split points, adjusting them to give each region approximately the same number of points.

Figure 11B:
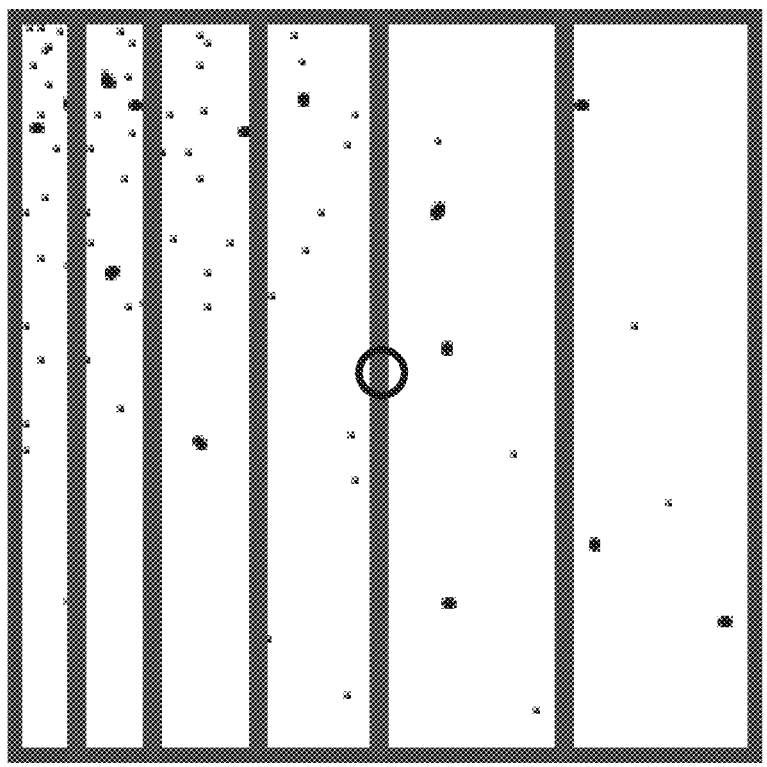

Hence for a non-limiting case of 128 valid points, then for an FSR 'x' curve based on 6 regions the horizontal split points will result in approximately 21 points per region, as illustrated in FIG. 11B, with the evenly occupied regions represented by the vertical lines. A similar approach is implemented for the vertical points and FSR 'y' curve.

Equivalently, the algorithm may start with a diagonal 1:1 x or y curve and then adjust curve values as a function of the number of points initially in each corresponding bin, e.g. as a ratio of the number of points actually in a bin to the number there would be if evenly distributed. Hence if there are too many points in a first bin then the start of the curve moves off the diagonal to map to a 1: <1 relationship, whilst if there are too few points in a first bin then the start of the curve moves off the diagonal to map to a 1: >1 relationship.

It will be appreciated that the steps used to re-project the coordinates and count the points in order to compute horizontal and vertical FSR curves do not need to be done for every image frame. Typically on a frame-by-frame basis the curve distribution for the preceding frame will be an adequate approximation of the curve distribution for the pixels in the current frame. Hence optionally these steps may only be re-done periodically, or when the camera viewpoint (or user gaze) moves by a predetermined amount, or when an in-game object moves by a predetermined amount within the scene, or any combination of one or more of these.

vii. The shadow map is rendered with FSR enabled and the coordinates are adjusted when doing texture sampling operations.

It will be appreciated that shadowmap rendering is an independent pass which can use FSR without having it enabled for main image rendering, although frequently main image rendering will also be using FSR (typically with a different set of x and y curves).

Conventionally when sampling the shadow map a non-distorted coordinate is used such as for example the center of the shadowmap camera which might notionally have the coordinate (0.5, 0.5) when sampling the shadowmap. However due to FSR used during rendering of shadowmap with the current technique, the texture coordinate is converted into a new one to sample the correct shadowmap data.

Referring again to FIG. 9A, here shadowmap 910A is not distorted and the center texture coordinate (0.5, 0.5) will sample the ball in the middle of the image space. However when shading that same ball with an FSR distorted texture, it is necessary to convert the coordinate (0.5, 0.5) into, for example, (0.4, 0.75), which is where that ball is now located in the distorted shadowmap 910B in FIG. 9B.

It will be appreciated that if texture space (shadow map space) is considered to be in a 0-1 range then (0,0) is the top left and (1,1) is the bottom right. Hence (0.5, 0.5) is the centre of that coordinate system.

Figure 11C:
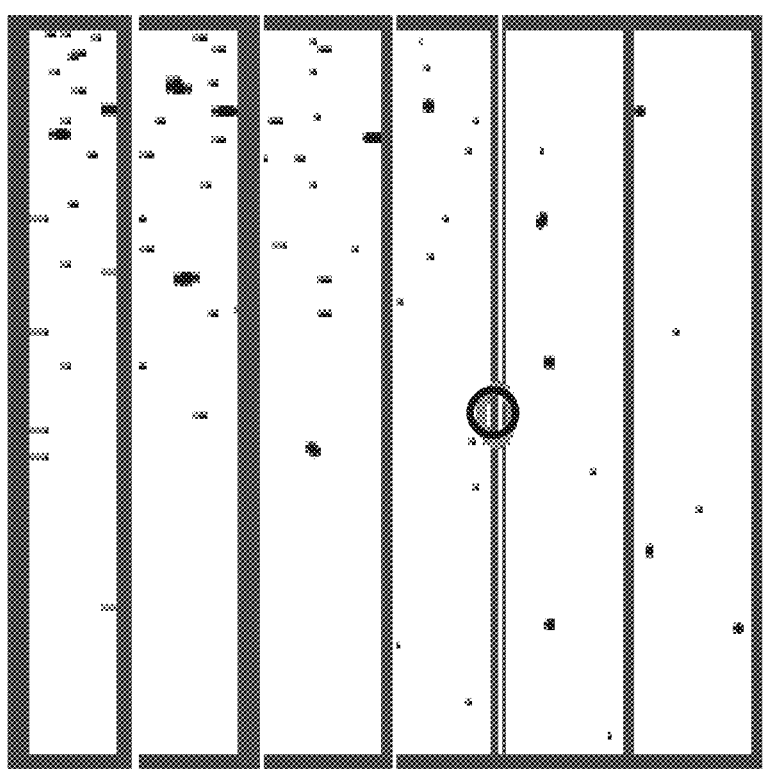

With the applied FSR technique remapping positions, this centre position can move (as can every other). Consequently within an FSR distorted texture space, the centre point can move to a different location with this space. This is shown in FIGS. 11B and 11C by the transition of the circle from the centre in FIG. 11B to another positon in FIG. 11C, where FIG. 11C corresponds to FIG. 11B after distortion using the FSR rasterization curves to show an even distribution of remapped points, but also a shift of the centre point).

Hence notably, unlike existing shadow mapping schemes, the present techniques use reprojection of image or screen pixels (e.g. valid pixels or optionally all image pixels) into shadow mapping coordinates, in order to define at least one of the x and y FSR curves according to their corresponding x or y distribution.

Optionally, hardware accelerated atomic counters supported by modern GPUs can be used to count the number of valid points in each shadowmap bin or bucket. Hence for example if 256 buckets are used for each axis, with a 1024×1024 shadowmap, then the count in bucket N on the vertical axis will indicate how many positions in image space will use texels [4*N, 4*N+3] vertically. The curves can then be adjusted to improve the uniformity of counts within the buckets, as discussed above.

The above technique thus works very efficiently within a GPU and/or CPU environment with hardware supported FSR capabilities.

Figure 12:
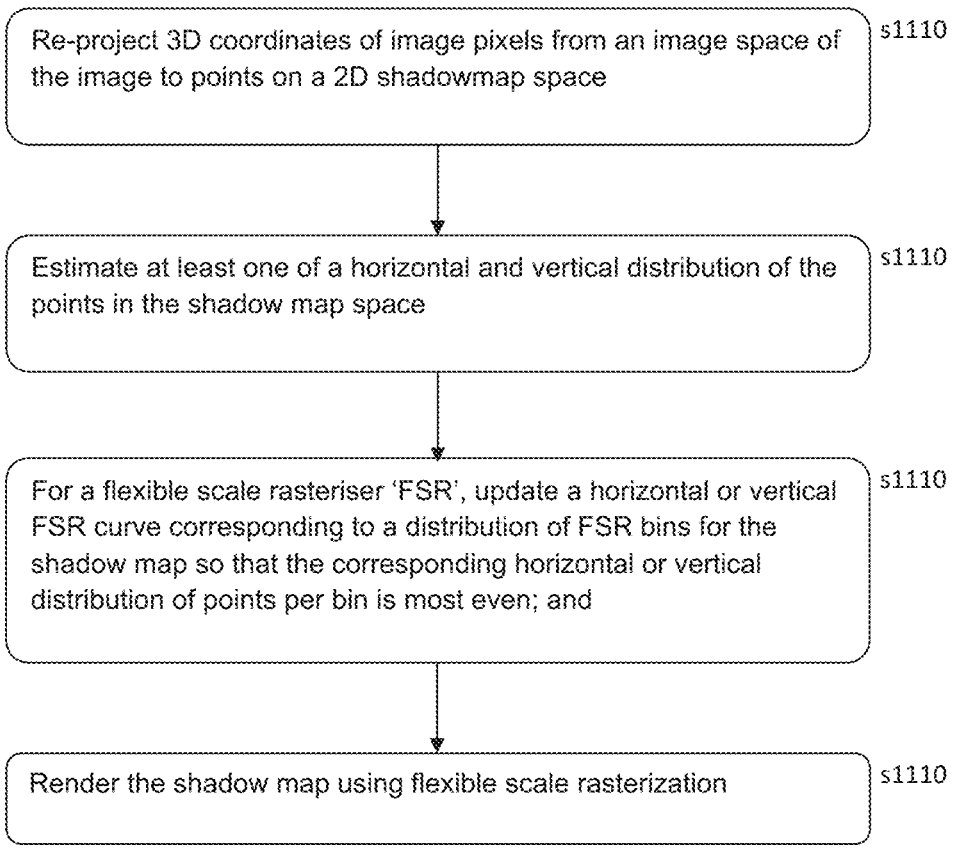
FIG. 12 is a flow diagram of a shadow rendering method for an image in accordance with embodiments of the present description.

Turning now to FIG. 12, in a summary embodiment of the present description, a method of shadow rendering for an image comprises the following steps.

In a first step s1110, re-project 3D coordinates of image pixels from an image space of the image to points on a 2D shadowmap space, as described elsewhere herein.

In a second step s1120, estimate at least one of a horizontal and vertical distribution of the points in the shadow map space, as described elsewhere herein.

In a third step s1130, for a flexible scale rasteriser 'FSR', updating a horizontal or vertical FSR curve corresponding to a distribution of FSR bins for the shadow map so that the corresponding horizontal or vertical distribution of points per bin is most even, as described elsewhere herein. In other words, the shadow map has a number of FSR bins associated with it and each FSR bin contains some of the points that have been projected into the shadow map space; an FSR curve represents the distribution of bins for the shadow map and the FSR curve (horizontal and vertical) is adjusted so that each FSR bin contains approximately the same number of points as all the other FSR bins.

In a fourth step s1140, render the shadow map using flexible scale rasterization, as described elsewhere herein.

It will be apparent to a person skilled in the art that variations in the above method corresponding to operation of the various embodiments of the method and/or apparatus as described and claimed herein are considered within the scope of the present disclosure, including but not limited to that:

the re-projecting step comprises re-projecting a spatially periodic sample of image pixels from the image space to produce a representative sampling of points in the shadow map space, as described elsewhere herein;

the re-projection step comprises multiplying 3D coordinates of image pixels from the image space with a shadow map projection matrix, as described elsewhere herein;

the estimating step comprises counting the number of points in the corresponding horizontal or vertical direction and calculating a target number of points per FSR bin based on the number of bins and the total number of points for the corresponding horizontal or vertical direction, as described elsewhere herein;

the updating step comprises modifying the horizontal or vertical split positions of the FSR bins to obtain a substantially even distribution of points per bin, and updating the corresponding horizontal or vertical FSR curve, as described elsewhere herein;

or, the updating step comprises modifying the horizontal or vertical FSR curve at successive positions on the curve corresponding to successive bins, according to the ratio of points within a respective bin to the average number of points per bin, as described elsewhere herein;

a same number of shadow texels are each associated with respective FSR bins, as described elsewhere herein, so that that each FSR bin contains the same number of shadow texels as the other FSR bins;

in this case, optionally one texel is associated per bin, as described elsewhere herein;

the method comprises the step of comprising the step of identifying valid pixels in the image that are pixels other than no-shadow-receiving pixels, wherein no-shadow-receiving pixels are pixels that do not sample from the shadowmap texture, and the re-projecting step comprises only re-projecting pixels from the identified valid pixels, as described elsewhere herein;

the rendering step comprises converting a shadowmap texture coordinate into a corresponding coordinate in an FSR distorted texture space, as described elsewhere herein;

one or more of the steps of re-projecting, estimating, and updating are performed less frequently than the step of rendering, as described elsewhere herein; and In this case, optionally one or more of the steps of re-projecting, estimating, and updating are performed in response to one or more events selected from the list consisting of a period elapsing, the period corresponding to a plurality of image frames; the virtual camera for which the image is rendered changes viewpoint by more than a first threshold amount; and an element within the image space moves by more than a second threshold amount, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present description, and referring now also to FIG. 1, a shadow rendering apparatus (such as a PlayStation 4® or PlayStation 5®) comprises the following:

Firstly, a re-projection processor (e.g. processor 20A and/or GPU 20B) adapted (for example by suitable software instruction) to re-project 3D coordinates of image pixels from an image space of the image to points on a 2D shadowmap space, as described elsewhere herein.

Secondly, a distribution estimation processor (e.g. processor 20A and/or GPU 20B) adapted (for example by suitable software instruction) to estimate at least one of a horizontal and vertical distribution of the points in the shadow map space, as described elsewhere herein.

Thirdly, an updating processor (e.g. processor 20A and/or GPU 20B) adapted (for example by suitable software instruction), for a flexible scale rasteriser 'FSR', to update a horizontal or vertical FSR curve corresponding to a distribution of FSR bins for the shadow map so that the corresponding horizontal or vertical distribution of points per bin is most even, as described elsewhere herein.

And fourthly, a rendering processor (e.g. processor 20A and/or GPU 20B) adapted (for example by suitable software instruction) to render the shadow map using the flexible scale rasteriser, as described elsewhere herein.

It will be appreciated that the shadow rendering apparatus may be further adapted to perform any of the methods and techniques described herein.

Hence for example the updating processor is adapted to modify the horizontal or vertical split positions of the FSR bins to obtain a substantially even distribution of points per bin, and update the corresponding horizontal or vertical FSR curve.

FIG. 1 illustrates a Sony Playstation 4® as an exemplary platform for the shadow rendering apparatus, although as noted above the PlayStation 5 (and any other suitable equipped computing platforms) may also be considered. The figure also shows other peripherals (such as a head mounted display unit 53) that may form an overall system that utilises the shadow rendering apparatus. Such a system may include one or more selected from the list consisting of: a head mounted display unit 53, a display 51, and audio system 52, a portable console 44 (which may also comprise the shadow rendering apparatus as an integrated system), and one or more input devices such as a handheld controller 42, 43, keyboard 45, or mouse 46, a camera 41, and a microphone 48.

In FIG. 1, a system unit 10 is provided, with various peripheral devices connectable to the system unit. The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22. The APU 20 communicates with a bus 40, optionally via an I/O bridge 24, which may be a discreet component or part of the APU 20.

Connected to the bus 40 are data storage components such as a hard disk drive 37, and a Blu-Ray® drive 36 operable to access data on compatible optical discs 36A. Additionally the RAM unit 22 may communicate with the bus 40. Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI® port.

The peripheral devices may include a monoscopic or stereoscopic video camera 41 such as the PlayStation® Eye; wand-style videogame controllers 42 such as the PlayStation® Move and conventional handheld videogame controllers 43 such as the DualShock® 4; portable entertainment devices 44 such as the PlayStation® Portable and PlayStation® Vita; a keyboard 45 and/or a mouse 46; a media controller 47, for example in the form of a remote control; and a headset 48. Other peripherals may similarly be considered such as a printer or a 3D printer (not shown), or a mobile phone 49 for example connected via Bluetooth® or Wifi Direct®.

The GPU 20B, optionally in conjunction with the CPU 20A, generates video images and audio for output via the AV output 39. Optionally the audio may be generated in conjunction with or instead by an audio processor (not shown). The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD® 9.0. The operating system may run on the CPU 20A, the auxiliary processor 38, or a mixture of the two. The operating system provides the user with a graphical user interface such as the PlayStation® Dynamic Menu. The menu allows the user to access operating system features and to select games and optionally other content.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A shadow rendering method for an image, comprising the steps of:
- re-projecting 3D coordinates of image pixels from an image space of the image to points on a 2D shadowmap space;
- estimating at least one of a horizontal and vertical distribution of the points in the shadow map space;
- for a flexible scale rasteriser 'FSR', updating a horizontal or vertical FSR curve corresponding to a distribution of FSR bins for the shadow map so that the corresponding horizontal or vertical distribution of points per bin is most even; and
- rendering the shadow map using the flexible scale rasterization.

2. The method of claim 1, in which the re-projecting step comprises re-projecting a spatially periodic sample of image pixels from the image space to produce a representative sampling of points in the shadow map space.

3. The method of claim 1, in which the re-projection step comprises multiplying 3D coordinates of image pixels from the image space with a shadow map projection matrix.

4. The method of claim 1, in which the estimating step comprises:
- counting the number of points in the corresponding horizontal or vertical direction, and
- calculating a target number of points per FSR bin based on the number of bins and the total number of points for the corresponding horizontal or vertical direction.

5. The method of claim 1, in which the updating step comprises: modifying the horizontal or vertical split positions of the FSR bins to obtain a substantially even distribution of points per bin, and updating the corresponding horizontal or vertical FSR curve.

6. The method of claim 1, in which the updating step comprises: modifying the horizontal or vertical FSR curve at successive positions on the curve corresponding to successive bins, according to the ratio of points within a respective bin to the average number of points per bin.

7. The method of claim 1, where a same number of shadow texels are each associated with respective FSR bins so that that each FSR bin contains the same number of shadow texels as the other FSR bins.

8. The method of claim 1, comprising the step of:
- identifying valid pixels in the image that are pixels other than no-shadow-receiving pixels, wherein no-shadow-receiving pixels are pixels that do not sample from the shadowmap texture; and
- the re-projecting step comprises only re-projecting pixels from the identified valid pixels.

9. The method of claim 1, in which the rendering step comprises: converting a shadowmap texture coordinate into a corresponding coordinate in an FSR distorted shadowmap space.

10. The method of claim 1, in which one or more of the steps of re-projecting, estimating, and updating are performed less frequently than the step of rendering.

11. The method of claim 10, in which one or more of the steps of re-projecting, estimating, and updating are performed in response to one or more events including at least one of:
- i. a period elapsing, the period corresponding to a plurality of image frames;
- ii. the virtual camera for which the image is rendered changes viewpoint by more than a first threshold amount; and
- iii. an element within the image space moves by more than a second threshold amount.

12. A non-transitory, computer readable storage medium containing a computer program comprising computer executable instructions adapted to cause a computer system to perform a shadow rendering method for an image by carrying out actions, comprising:
- re-projecting 3D coordinates of image pixels from an image space of the image to points on a 2D shadowmap space;
- estimating at least one of a horizontal and vertical distribution of the points in the shadow map space;
- for a flexible scale rasteriser 'FSR', updating a horizontal or vertical FSR curve corresponding to a distribution of FSR bins for the shadow map so that the corresponding horizontal or vertical distribution of points per bin is most even; and
- rendering the shadow map using the flexible scale rasterization.

13. An apparatus including a shadow rendering apparatus, comprising:
- a re-projection processor adapted to re-project 3D coordinates of image pixels from an image space of the image to points on a 2D shadowmap space;
- a distribution estimation processor adapted to estimate at least one of a horizontal and vertical distribution of the points in the shadow map space;
- an updating processor adapted, for a flexible scale rasteriser 'FSR', to update a horizontal or vertical FSR curve corresponding to a distribution of FSR bins for the shadow map so that the corresponding horizontal or vertical distribution of points per bin is most even; and
- a rendering processor adapted to render the shadow map using the flexible scale rasteriser.

14. The apparatus of claim 13, in which the updating processor is adapted to modify the horizontal or vertical split positions of the FSR bins to obtain a substantially even distribution of points per bin, and update the corresponding horizontal or vertical FSR curve.

15. The apparatus of claim 13 further comprising a head mounted display unit.

* * * * *